United States Patent Office 2,755,916
Patented July 24, 1956

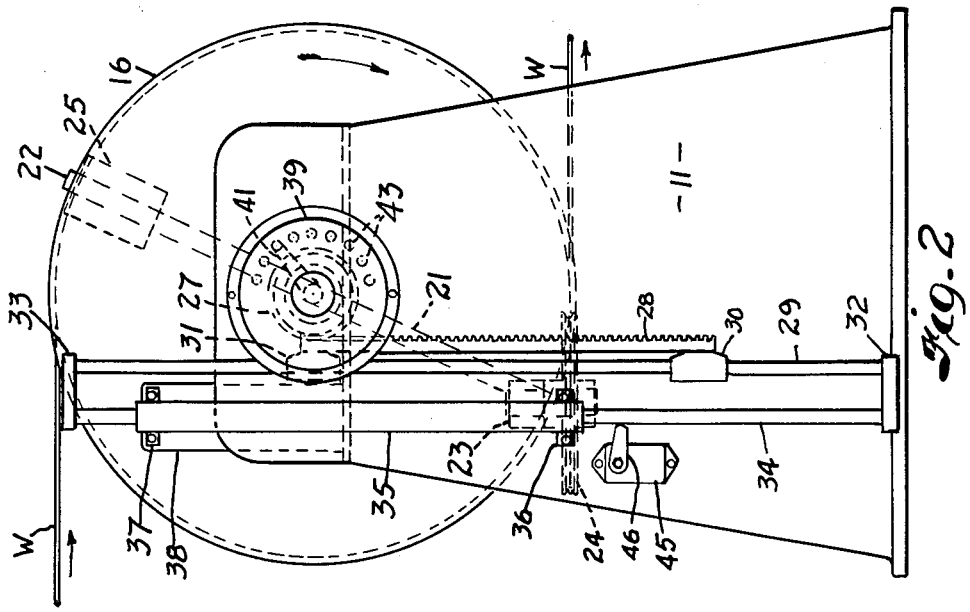
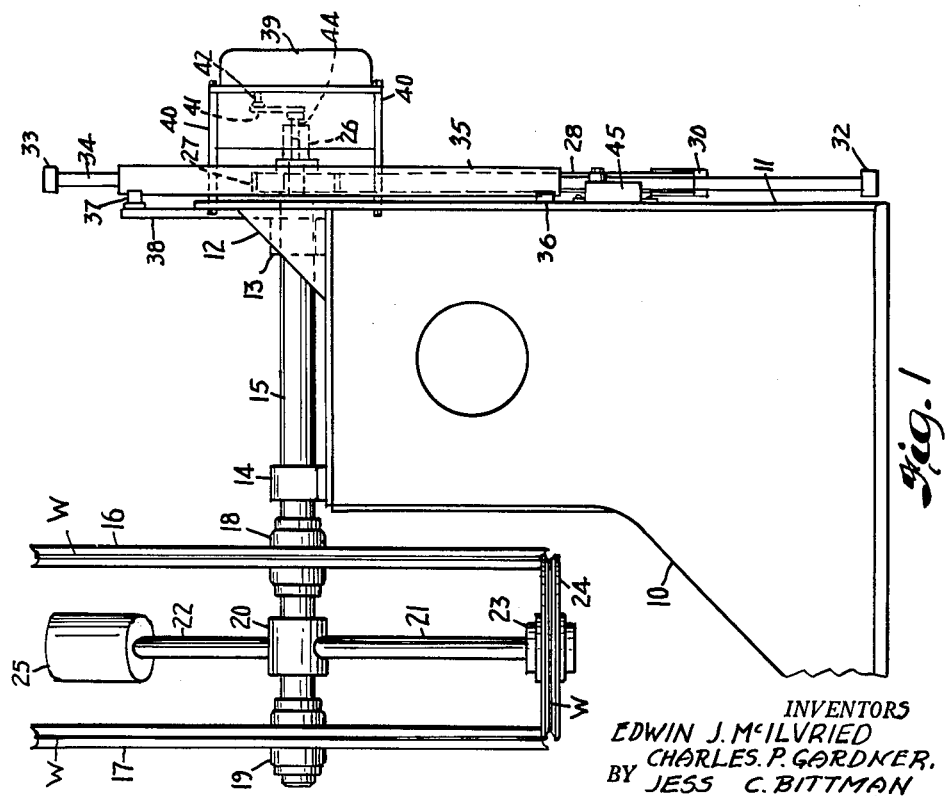

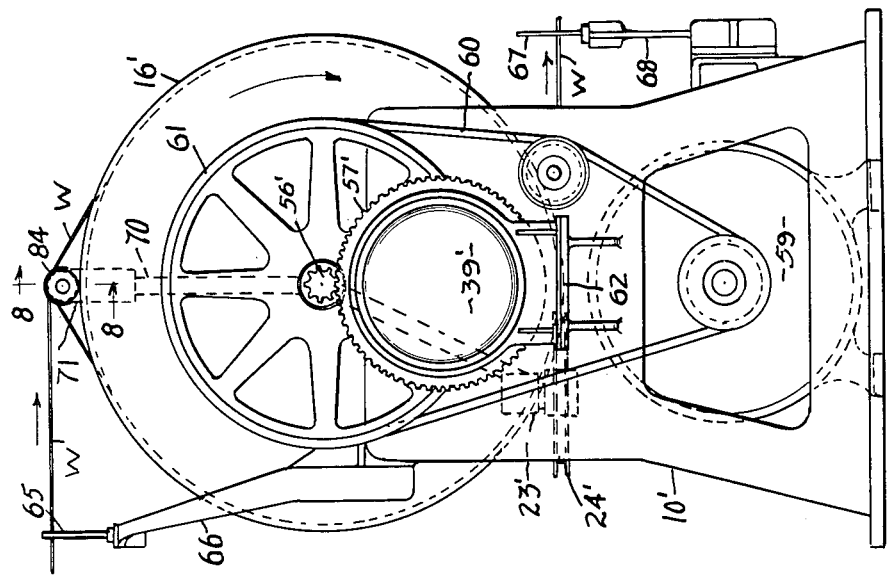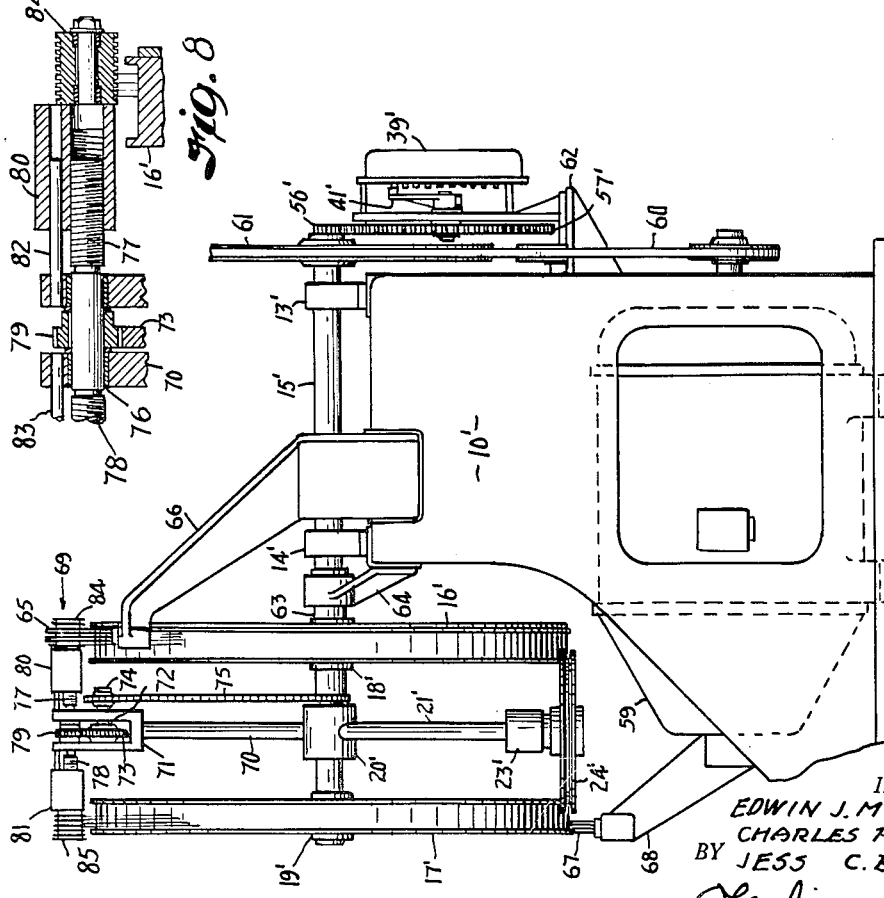

2,755,916

WIRE STORAGE AND REGULATING MEANS

Edwin J. McIlvried, Medina, Charles P. Gardner, Randolph, and Jess C. Bittman, Cuyahoga Falls, Ohio, assignors to The Vaughn Machinery Company, Cuyahoga Falls, Ohio, a corporation of Ohio Application May 13, 1954, Serial No. 429,472

14 Claims. (Cl. 203—12)

This invention, relating as indicated to wire storage and regulating means, is more particularly concerned with an improved festoon unit especially adapted for use in the high speed transfer of wire between independently driven operating machines.

In order to realize safely a high rate of wire transfer from one such machine to another, for example from an annealer to a take-up block in conventional wire treating apparatus, it is necessary to provide, for obvious reasons, some supervisory agency to insure that the two machines operate at the same speed. The supervision must be continuous, instantly responsive to any speed differential between the two machines, and quick to compensate for any change in the speed relation which might occur. In any control system, there is an inevitable time lag between the detection of a condition change and correction thereof, and in high speed wire advance an extremely efficient variable storage device is needed to accumulate and supply wire as deviations from normal operating conditions might require while compensation is being effected. Our new festoon meets these exacting requirements with relatively simple and economical structure.

In other of its more important aspects, the invention provides a highly efficient means for synchronizing two operating machines between which wire is advanced, instantly responsive to any change in the speed relation thereof. The invention also provides a variable storage device operative to compensate high speed changes in tension of advancing wire in direct response to a difference in the respective rates with which the wire is supplied to and withdrawn from the device. The combination of these two features enables wire to be advanced safely between two independently driven machines at a very high rate with effective automatic regulation of the advance. In addition, we provide guide means for the variable storage device to assist in the supply and withdrawal of the wire, further facilitating a high speed of operation. More particularly, the variable storage device includes a rotary receiver adapted to receive multiple turns side-by-side and the guide means acts with the winding and unwinding of wire on and from the receiver to maintain the turns separated and thereby prevent crossover.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevational view of a basic form of our improved festoon unit;

Fig. 2 is an end view thereof as seen from the right in Fig. 1;

Fig. 6 is a side elevational view of the festoon further equipped with means for guiding the wire and maintaining the turns separated;

Fig. 7 is a right hand end view of the festoon as shown in Fig. 6; and

Fig. 8 is a partial cross-sectional view showing the inner construction of one grooved roll used to maintain the multiple turns of wire stored by the festoon separated.

Figure 3:
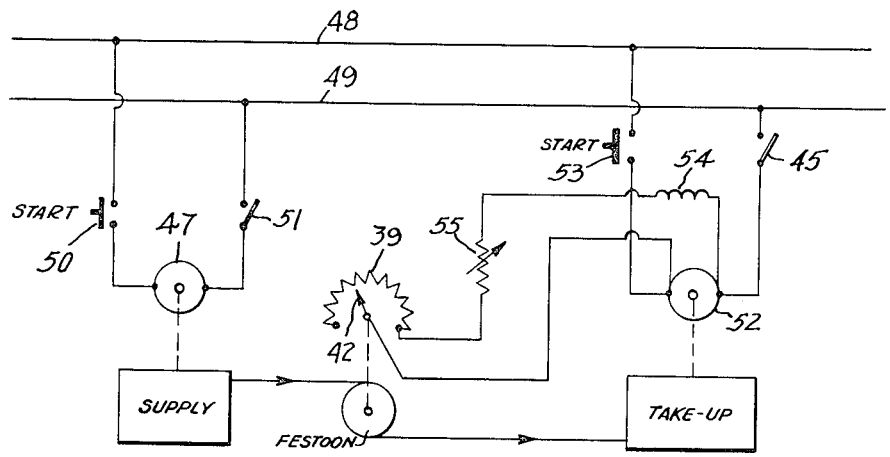
Fig. 3 is a schematic diagram showing an electrical control circuit by means of which the festoon is operative to regulate the speed of a take-up unit in wire handling apparatus.

Referring now to the drawings in detail, the basic construction of the festoon as shown in Figs. 1 and 2 comprises a stand 10 on which the several operating parts of the device are mounted. The stand is made up of plates welded at their seams with the right hand end plate 11 projecting above the top of the stand to provide additional mounting area. This upper projection of plate 11 is strengthened at its sides by means of triangular pieces, one of which is designated by reference numeral 12, welded thereto and to the top plate of the stand.

Attached to the top of the stand are two ball bearing pillow blocks 13 and 14 which rotatably mount a shaft 15. At one end, the shaft supports two large sheaves 16 and 17 of the same diameter on ball bearing assemblies 18 and 19, respectively, so that these sheaves may rotate freely relative to the shaft. Keyed to the shaft in the spaced between the large sheaves is a hub 20 from which two arms 21 and 22 extend radially in opposite directions.

The arm 21 is a transfer arm having a ball bearing pedestal 23 at its outer end on which a third and smaller sheave 24 is mounted. This smaller sheave functions to guide the wire from one large sheave to another, as will appear more fully hereinafter, and is, therefore, supported so as to be generally tangential to the peripheries of the large sheaves. The second arm, arm 22, is a counterweight arm having a weight 25 at its free outer end. Since hub 20 is keyed to shaft 15, the two will rotate together.

The other end of the shaft 15 extends through end plate 11 of the stand and has a reduced end portion 26 on which a pinion 27 is keyed. This pinion meshes with a rack 28 attached at its ends to a vertical movement rod 29 by means of mounting blocks 30 and 31. The vertical movement rod is connected by end pieces 32 and 33 to the piston rod 34 of a single-acting air cylinder 35, the latter being attached to the stand end plate by means of brackets 36 and 37 and the mounting plate 38. The air cylinder is designed to apply a predetermined torque resiliently to the shaft 15 through the rack and pinion engagement in order to bias the shaft and hence the transfer arm 21 and guide sheave 24 rotatively. Also mounted on the end plate 11 of the stand is a dancer rheostat 39 which is supported beyond the end of the shaft by means of the standards 40. The rheostat has a wiper arm 41 carrying a contact member 42 adapted selectively to engage the fixed contacts 43 of the rheostat when rotated, thereby to vary the effective electrical resistance in well-known manner. In this form of the festoon, wiper arm 41 has a shaft 44 fitted into the reduced end portion 26 of shaft 15 to provide a direct driving connection between shaft 15 and the wiper arm. It will be apparent then that rotation of the shaft 15 will produce a change in the effective resistance of the rheostat proportional to the magnitude and direction of shaft rotation.

The two large sheaves 16 and 17 are each adapted to receive several turns of wire side-by-side and, in use, the wire coming to the festoon is first wrapped one or more turns about one large sheave, preferably sheave 16, bent about approximately the outer circumferential half of guide sheave 24, wrapped one or more turns on sheave 17 in a direction opposite to the turn direction on sheave 16, and then led from the festoon. Since the sheaves 16 and 17 are freely rotatably supported on shaft 15, they will be rotated by advance of the wire through the festoon unit, in opposite directions corresponding to the respective directions of wrapping thereon. The air cylinder is operative through its biasing of shaft 15 to apply resiliently a predetermined tension to the wire as engaged by the guide sheave. It will be seen that any change in such tension will cause the transfer arm and shaft to rotate relative to the large sheaves and that this produces two effects. In the first place, such revolution of the transfer arm causes the wire to be wound or unwound simultaneously on or from both large sheaves depending upon the direction of revolution. Secondly, rotation of the shaft 15 will rotate the wiper arm shaft causing the rheostat resistance to vary, again dependent on the direction and magnitude of rotation. As set up in Figs. 1 and 2, the wire W is initially wrapped in a clockwise direction around sheave 16 and in a counterclockwise direction around sheave 17. Thus when transfer arm 21 revolves in a clockwise direction, it will cause additional turns to be placed on both large sheaves and, when revolved in a counterclockwise direction, turns to be removed from both sheaves.

With the air cylinder biasing the shaft 15 and the transfer arm in a clockwise direction, the wrapping and unwrapping actions of the arm just described will be respectively responsive to decreases and increases in the actual wire tension acting on the guide sheave relative to the predetermined tension applied by the cylinder. When this actual tension equals the predetermined value, the transfer arm will, of course, remain stationary. The amount of wire that may be stored in this manner in the festoon is considerable due to the large diameter of the sheaves and the fact that each accommodates a plurality of turns of wire with both being simultaneously wound. The capacity is naturally limited, although adequate to handle easily normal demands, and a limit switch 45 having an actuating element 46 may be provided on the stand end plate 11 in a position so that the element 46 will be engaged and moved by the lower end piece 33 of the air cylinder piston rod in the extreme supply position of the latter, that is, when unwinding causes the festoon to run out of storage. Operation of the switch in this manner may be utilized to shut off the external means advancing the wire and thereby stop the advance completely when the festoon reaches its storage capacity.

The manner in which the several control actions provided by the above structure are utilized in wire handling apparatus will be understood from a description of Fig. 3, wherein the festoon is shown operatively positioned between independently driven supply and take-up units. The supply unit may, for example, be an annealer or a wire drawing machine driven by an electric motor 47 connected to supply conductors 48 and 49 through an energization circuit including a start switch 50 and an additional series switch 51. The take-up unit, which may be a takeup block or spooler, is likewise driven by an electric motor 52 connected to the supply conductors. The usual start switch 53 is provided for this motor and the additional switch in the energization circuit here is the limit switch 45, previously mentioned. Motor 52 has a shunt field coil 54 which may be varied to control the motor speed. Connected in circuit with the field coil is a variable resistance 55, for adjustment purposes, and the rheostat 39 which has its wiping contact 42 driven by shaft 15 of the festoon. In this system the wire is discharged from the supply unit at a given rate determined by drive motor 47, wrapped oppositely around the two large sheaves as described above, and then advanced from the festoon by the take-up unit at the rate provided by drive motor 52 of the latter. Sheave 16 will, therefore, rotate in a clockwise direction at the same linear speed in feet per minute as allowed by the supply machine, while sheave 17 will rotate in a counterclockwise direction at the speed determined by the operating speed of the take-up unit.

Any change in relation of speed between the two machines, that is, the supply and take-up, correspondingly changes the speed relation of the sheaves 16 and 17. This causes the transfer arm to revolve and the rheostat 39 to vary the field of the take-up motor 52. Relative speed between the two sheaves producing increased tension in the wire therebetween will result in counterclockwise revolution of the transfer arm, thereby to unwrap the wire from both sheaves and vary the rheostat to decrease the operating speed of the take-up unit. Similarly, a relative speed productive of decreased tension will result in winding of the wire on both sheaves and an increase in the operating speed of the take-up. If some grossly improper condition occurs which causes the festoon to run out of storage, switch 45 is actuated to deenergize the take-up motor. Switch 51 in the supply motor circuit could be interconnected for actuation with switch 45, if desired.

The constant regulation of the take-up speed in the manner set forth maintains the two machines in synchronism, each change in speed relation producing a compensating change in operating speed of the take-up. This control could also be applied to the supply unit or commonly to both supply and take-up, the latter arrangement employing a balancing electrical circuit by means of which the speed of one would increase simultaneously with a decrease in the speed of the other, or the equivalent. It will be appreciated that changes in speed relation of the two sheaves may be caused by various combinations of increases and decreases in the respective speeds thereof. For example, an increase in the rate of supply will produce a change comparable to a decrease in the rate of take-up.

Figure 4:
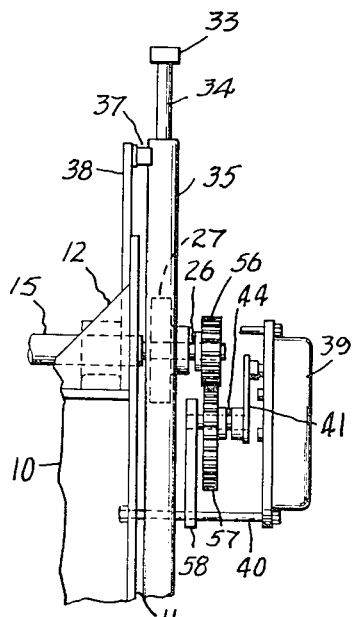
Fig. 4 is a fragmentary elevational view of the festoon having a slightly different driving connection with the rheostat which constitutes the electrical control element.
Figure 5:
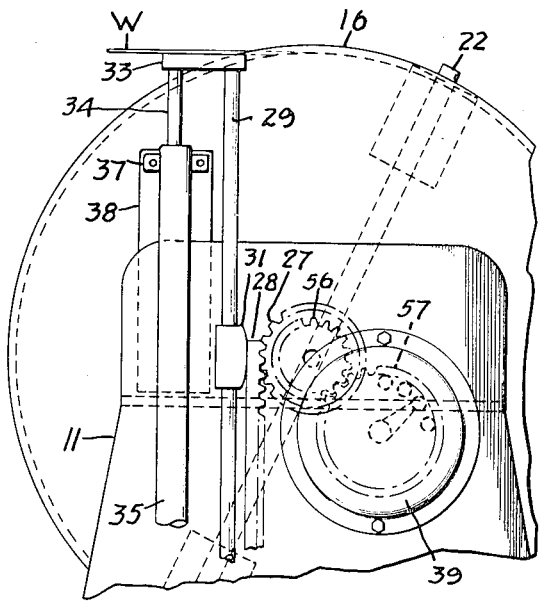
Fig. 5 is an end view of the Fig. 4 structure.

The remaining forms of the festoon illustrated are operative in the same manner with respect to the storage and motor control features and differ only in the details now to be described. In Fig. 1, the shaft of the rheostat wiper arm is shown connected directly to the shaft 15. However, intermediate gearing may be used to provide a reduction in speed, and we have shown such a modification in Figs. 4 and 5. In this form, a small gear 56 is keyed to the end of the shaft reduced end portion 26 and a larger gear 57 on the wiper arm shaft 41 is meshed therewith. The latter gear and shaft 41 are suitably supported on a plate 58 for rotation by the driving gear 56.

A more complete and preferred form of the festoon unit is illustrated in Figs. 6 to 8. While the basic structural elements of this form are substantially as described in connection with Fig. 1, the corresponding elements are here designated with primed reference numerals because of slight structural changes therein. The primary distinguishing feature of this form is the addition of wire guide and turn separating means, but before considering the same the other relatively minor differences will be noted. A torque motor 59 is here used to bias shaft 15' in lieu of the air cylinder, this motor being connected to the shaft by means of the V-belt 60 and the large pulley 61 secured to the shaft end. The rheostat 39' is supported on a platform 62 at the right hand end of the stand 10' and is driven by the shaft through the gears 56' and 57'. The sheave 16', rather than being supported directly on shaft 15', is mounted on a sleeve 63 which surrounds the shaft and is held stationary by a support arm 64.

Stationary guide fingers 65 are positioned by a supporting arm 66 connected to the stand to guide the wire supplied to the festoon unit to the sheave 16' thereof. A second set of stationary guide fingers 67 mounted on an arm 68 is provided at the opposite side of the unit to guide the wire as it is led away from the sheave 17'.

Hub 20' is keyed to the shaft 15' and supports a turn separating mechanism indicated generally at 69 on an arm 70 extending radially in angular displacement relative to transfer arm 21'. At the outer end of arm 70 is a yoke 71 which supports a small shaft 72 having a gear 73 keyed thereon between the arms of the yoke and a revolving sprocket 74 keyed on the end thereof projecting inwardly toward sheave 16'. The outer end of stationary sleeve 63 is in the form of a sprocket having a chain 75 engaged thereabout and about the revolving sprocket 74, so that the gear 73 will be driven when the transfer arm and shaft 15' rotate.

The yoke 71 also supports a stud member 76 having oppositely threaded end portions 77 and 78 and a small gear 79 keyed thereon to mesh with the drive gear 73. Stud 76 extends on an axis parallel to the axis of shaft 15' and, in the construction shown, portion 77 has a right hand thread, while the portion 78 has a left hand thread. Threadably engaged with the portion 77 is a cylindrical mounting block 80, and a similar block 81 is engaged with the portion 78 of the stud. These blocks are drilled to receive guiding and supporting rods 82 and 83, respectively, secured to the arms of the yoke. It will be seen that rotation of the stud through the driving connection of the revolving sprocket 74 will cause the blocks 80 and 81 to move together axially in and out. At the outer end of the block 80 a grooved roll 84 is attached with this block and roll positioned adjacent the periphery of the sheave 16'. A second grooved roll 85 is attached to the outer end of block 81 adjacent the periphery of the sheave 17', the two grooved rolls thereby being in position to receive in their grooves the turns of wire on the sheaves.

By virtue of the drive for the two grooved rolls, as described, both rolls will move inwardly when the transfer arm revolves clockwise and outwardly with counterclockwise revolution of this arm. Relating the grooved roll movement to the winding and unwinding actions, the rolls move inwardly as the transfer arm increases the turns and outwardly when the transfer arm revolves to unwind the stored turns. As a result, the grooves of the rolls are brought successively into operative alignment with the respectively associated stationary guide fingers so that each turn of wire on the sheaves will be engaged in a separate groove. This operation will be clear from a consideration of the manner in which sheave 16' is initially wound. The incoming wire is threaded between guide fingers 65 and laid in the extreme left hand groove of roll 84, the latter in this condition being in its outermost position, and then wrapped about the sheave by revolution of the transfer arm. As the arm revolves, roll 84 moves axially inwardly a distance such that when it again engages the wire span between the sheave and fingers 65 it will receive and lift the same in its next succeeding groove. Continued revolution of the transfer arm and roll moves the latter progressively inwardly, with the incoming wire similarly engaged in successive grooves of the roll each time the roll engages the same in its travel circumferentially of the sheave. The inward movement of the roll, of course, shifts the travelling wire on the sheave inwardly as succeeding turns are wrapped. During decrease of the number of turns stored on this sheave, the roll shifts axially outwardly to ensure that on subsequent winding the incoming span of wire is engaged in the next succeeding empty groove. Grooved roll 85 cooperates in like manner with sheave 17', the plural turns on both sheaves thus being maintained separated and cross-over thereof prevented.

Returning briefly to the fundamental operation of the festoon, it will be seen that a directly acting control of a nature to maintain synchronism between two independently driven operating machines handling wire is provided. Both the torque motor and air cylinder described above act to maintain a substantially constant predetermined wire tension; that is, they provide a definite bias which is unaffected by the wrapping and unwrapping actions of the transfer arm so that a constant standard exists for comparison with actual wire tension. Other biasing means suitable for this purpose will suggest themselves to those skilled in the art. While we have shown a rheostat as the element producing an electrical quantity variable to regulate the drive motor speed of one such machine, it will be obvious that other electrical and indeed mechanical arrangements may be used to accomplish this purpose. The large capacity of the festoon, together with this direct speed regulation, enables the wire to be advanced safely between the machines at a high rate. The additional advantages derived from the turn separating means of the preferred form likewise assist in the high speed advance by eliminating the possibilities of cross-over and interference in the multiple turns of wire stored. It will be appreciated that the improved festoon unit can handle other elongated work or strands as well as wire.

Other modes of applying the principle of the invention may be employed, change being made as regards the details described, provided the features stated in any of the following claims, or the equivalent of such, be employed.

We therefore particularly point out and distinctly claim as our invention:

1. In wire handling apparatus including two operating machines between which the wire is advanced, each machine having a drive motor; wire storage and regulating means operatively positioned between the two machines, comprising a pair of rotary receivers mounted in spaced apart relation on a single axis and adapted to have the wire wrapped thereabout respectively in opposite directions, transfer means operative to lead the wire from one receiver to the other, means resiliently biasing said transfer means into engagement with the wire to apply a predetermined tension thereto, means mounting said transfer means for revolution relative to said receivers so that the transfer means is operative to wrap and unwrap wire on and from both receivers respectively in response to decreases and increases in wire tension, speed regulating means for one of the operating machines, and means responsive to the magnitude and direction of revolution of said shaft as aforesaid controlling said speed regulating means to produce a compensating change in the speed of operation of said one machine, thereby to maintain operation of the two machines in synchronism.

2. In wire handling apparatus including two operating machines between which the wire is advanced, each machine having a drive motor; wire storage and regulating means operatively positioned between the two machines, comprising a pair of freely rotatable sheaves adapted to have the wire wrapped thereabout in opposite directions and to be correspondingly rotated by advance of the wire, a transfer arm mounted for rotation relative to said sheaves operative to engage and guide the wire from one to the other, means for rotatively biasing said transfer arm to apply a predetermined tension to the wire, the sheaves being rotated by the advancing wire respectively at the speeds provided by the operating machines, the transfer arm remaining stationary when the speeds of rotation of the sheaves are the same and rotating relative to the sheaves when such speeds differ to wrap and unwrap wire on and from both sheaves, an electrical circuit including a control element operable to vary the drive motor speed of one machine, and means actuating said control element responsively to rotation of said transfer arm to produce a change in motor speed compensating for the speed differential of the sheaves producing such rotation.

3. In wire handling apparatus including two operating machines between which the wire is advanced, each machine having a drive motor; wire storage and regulating means operatively positioned between the two machines, comprising a pair of rotary receivers mounted in spaced apart relation on a single axis and adapted to have the wire wrapped thereabout respectively in opposite directions, transfer means operative to lead the wire from one receiver to the other, means resiliently biasing said transfer means into engagement with the wire to apply a predetermined tension thereto, means mounting said transfer means for revolution relative to said receivers so that the transfer means is operative to wrap and unwrap wire on and from both receivers respectively in response to decreases and increases in wire tension, an electrical control circuit for the drive motor of one operating machine including a rheostat actuable to vary the speed of such motor, and means driving said rheostat responsively to the magnitude and direction of revolution of said transfer means such to produce a change in the motor speed compensating for the change in wire tension causing such revolution.

4. In wire handling apparatus including two operating machines between which the wire is advanced, each machine having a drive motor; wire storage and regulating means operatively positioned between the two machines, comprising a shaft, first and second sheaves rotatably mounted on said shaft in axially spaced apart relation, a transfer arm secured to and extending radially of said shaft in the space between the two sheaves, wire guide means carried by said transfer arm arranged adjacent the peripheries of said sheaves to engage wire passing from one to the other, means applying a predetermined torque to said shaft to cause said guide means to tension the wire thus engaged thereby, the wire being led from the initial machine to the first sheave, wrapped thereabout, passed over the guide means to the second sheave, wrapped oppositely about the latter, and then led to the advance machine, whereby the first and second sheaves are rotated by the advancing wire at the speeds respectively provided by the drive motors of the two machines, any change in the speed relation of the machines causing a corresponding change in speed relation of the sheaves, which, in turn, produces a change in tension in the wire engaged by said guide means with consequent revolution of said transfer arm and shaft relative to the sheaves, such revolution of the transfer arm causing wire to be wrapped and unwrapped on and from both sheaves respectively in response to decrease and increase in the wire tension, speed regulating means for one of the operating machines, and means responsive to the magnitude and direction of revolution of said shaft as aforesaid controlling said speed regulating means to produce a compensating change in the speed of operation of said one machine, thereby to maintain operation of the two machines in synchronism.

5. In wire handling apparatus including two operating machines between which the wire is advanced, each machine having a drive motor; wire storage and regulating means operatively positioned between the two machines, comprising a shaft, first and second sheaves rotatably mounted on said shaft in axially spaced apart relation, a transfer arm secured to and extending radially of said shaft in the space between the two sheaves, wire guide means carried by said transfer arm arranged adjacent the peripheries of said sheaves to engage wire passing from one to the other, means applying a predetermined torque to said shaft to cause said guide means to tension the wire thus engaged thereby, the wire being led from the initial machine to the first sheave, wrapped thereabout, passed over the guide means to the second sheave, wrapped oppositely about the latter, and then led to the advance machine, whereby the first and second sheaves are rotated by the advancing wire at the speeds respectively provided by the drive motors of the two machines, any change in the speed relation of the machines causing a corresponding change in speed relation of the sheaves, which, in turn, produces a change in tension in the wire engaged by said guide means with consequent revolution of said transfer arm and shaft relative to the sheaves, such revolution of the transfer arm causing wire to be wrapped and unwrapped on and from both sheaves respectively in response to decrease and increase in the wire tension, an electrical control circuit for the drive motor of one operating machine including a rheostat actuatable to vary the speed of such motor, and means interconnecting said shaft and rheostat for driving the latter responsively to the magnitude and direction of shaft rotation to produce a compensating change in the speed of operation of said one machine, thereby to maintain operation of the two machines in synchronism.

6. In wire handling apparatus including two operating machines between which the wire is advanced, each machine having a drive motor; wire storage and regulating means operatively positioned between the two machines, comprising a pair of rotary receivers mounted in spaced apart relation on a single axis and adapted to have the wire wrapped thereabout respectively in opposite directions, transfer means operative to lead the wire from one receiver to the other, means resiliently biasing said transfer means into engagement with the wire to apply a predetermined tension thereto, means mounting said transfer means for revolution relative to said receivers so that the transfer means is operative to wrap and unwrap wire on and from both receivers respectively in response to decreases and increases in wire tension, a pair of grooved rolls disposed respectively adjacent the peripheral surfaces of the receivers on an axis substantially parallel to the receiver axis, the individual turns of wire on the receivers being engaged in separate grooves of said rolls thereby to maintain the turns separated, speed regulating means for one of the operating machines, and means responsive to the magnitude and direction of revolution of said shaft as aforesaid controlling said speed regulating means to produce a compensating change in the speed of operation of said one machine, thereby to maintain operation of the two machines in synchronism.

7. In wire handling apparatus including two operating machines between which the wire is advanced, each machine having a drive motor; wire storage and regulating means operatively positioned between the two machines, comprising a shaft, first and second sheaves rotatably mounted on said shaft in axially spaced apart relation, a transfer arm secured to and extending radially of said shaft in the space between the two sheaves, wire guide means carried by said transfer arm arranged adjacent the peripheries of said sheaves to engage wire passing from one to the other, means applying a predetermined torque to said shaft to cause said guide means to tension the wire thus engaged thereby, the wire being led from the initial machine to the first sheave, wrapped thereabout, passed over the guide means to the second sheave, wrapped oppositely about the latter, and then led to the advance machine, whereby the first and second sheaves are rotated by the advancing wire at the speeds respectively provided by the drive motors of the two machines, a pair of grooved rolls disposed respectively adjacent the peripheries of the sheaves on an axis substantially parallel to the sheave axis, the individual turns of wire on the sheaves being engaged in separate grooves of said rolls thereby to maintain the turns separated, any change in the speed relation of the machines causing a corresponding change in speed relation of the sheaves, which, in turn, produces a change in tension in the wire engaged by said guide means with consequent revolution of said transfer arm and shaft relative to the sheaves, such revolution of the transfer arm causing wire to be wrapped and unwrapped on and from both sheaves respectively in response to decrease and increase in the wire tension, speed regulating means for one of the operating machines, and means responsive to the magnitude and direction of revolution of said shaft as aforesaid controlling said speed regulating means to produce a compensating change in the speed of operation of said one machine, thereby to maintain operation of the two machines in synchronism.

8. Wire storage and regulating means, comprising a shaft, two sheaves of a large diameter mounted for rotation on said shaft in axially spaced apart relation, said sheaves, each accommodating multiple turns of wire, being adapted to have wire wrapped thereabout respectively in opposite directions and to be correspondingly rotated by advance of the wire, transfer and guide means secured to said shaft intermediate the two sheaves including first and second arms extending radially of the shaft in angularly displaced relation, a third sheave supported on said first arm for rotation about the axis thereof generally tangentially to the peripheries of said two sheaves, a pair of grooved rolls supported by the second arm with the rolls disposed respectively adjacent the peripheries of said two sheaves on an axis substantially parallel to the shaft axis, said rolls being axially movable and adapted to receive the individual turns of wire on the sheaves in separate grooves thereby to maintain such turns separated, means applying a predetermined torque resiliently to said shaft to tension the wire between the two large sheaves through the engagement therewith of the third sheave, the transfer means secured to the shaft remaining stationary when said two sheaves rotate at the same speed and revolving in response to any change in relative speed of the two producing a change in wire tension, an increase and decrease in tension causing the transfer means to unwrap and wrap the wire respectively on and from both sheaves, and drive means for moving said grooved rolls axially in and out in response to revolution of the transfer means to guide the laying on and removal of the turns on the sheaves.

9. Wire storage and regulating means, comprising two sheaves mounted freely for rotation about the same axis in axially spaced apart relation, said sheaves being adapted to receive multiple turns of wire on each with the turns on one wrapped oppositely to the turns on the other, guide means for directing the wire between the two sheaves, means biasing said guide means resiliently into engagement with the wire to apply a predetermined tension to the same, means mounting said guide means for revolution relative to said sheaves responsively to changes in such tension, the guide means revolving to wrap and unwrap the wire on and from both sheaves respectively in response to decreases and increases in the wire tension, turn separating means in the form of two grooved rolls disposed respectively adjacent the peripheries of the sheaves on an axis substantially parallel to the sheave axis, and means for moving said rolls axially in response to the wrapping and unwrapping action of said guide means so each turn of wire on the sheaves will engage in a separate groove of the rolls, thereby to maintain the turns separated and prevent cross-over thereof.

10. Wire storage and regulating means, comprising a pair of rotary receivers for wire mounted in spaced apart relation on a single axis, each receiver being adapted to have a plurality of turns of the wire wound thereon with the turns respectively on the two being wound in opposite directions, means operative to wind and unwind the wire on and from both receivers simultaneously including a revolvable transfer arm carrying guide means engaging the wire as it passes from one receiver to the other, the winding and unwinding actions resulting from revolution of said arm and guide means relative to said receivers in respective opposite directions, turn separating means in the form of two grooved rolls respectively disposed adjacent the peripheral surfaces of the receivers on an axis substantially parallel to the receiver axis, support means for said rolls interconnected with said transfer arm so that the rolls will revolve with the arm, said support means including adjustable positioning means for the rolls operative to move the latter axially, and drive means for said positioning means operative automatically to position the rolls adjustably in response to revolution of said transfer arm so that successively wound and unwound turns on the receivers are separated by being individually engaged in separate grooves of the rolls.

11. Wire storage and regulating means, comprising a rotary receiver adapted to support a plurality of turns of wire, a grooved roll disposed adjacent the peripheral surface of said receiver on an axis substantially parallel to the receiver axis, adjustable positioning means for said roll operative to move the same along its axis in both directions, transfer means operative to wind and unwind wire on and from said receiver by revolving relative thereto, and means for driving said roll positioning means automatically in response to revolution of said transfer means to adjust the roll axially relative thereto so that each turn of wire is individually engaged in and removed from a separate grooves of the roll.

12. In combination with a wire advancing machine, a wire supply, an idler sheave adapted to have the wire from such supply wrapped thereabout and to be rotated by advance of the wire in operation of the machine, transfer means for said sheave mounted for rotation relative thereto to wind and unwind wire on and from the sheave, means resiliently biasing said transfer means in a direction to apply a predetermined tension to the wire, the transfer means thereby remaining stationary when actual tension equals such value and rotating relative to the sheave to wind and unwind the wire respectively in response to decreases and increases in tension, the sheave thereby forming a storage for the wire, an electrical control circuit for regulating the operating speed of such machine, and means operative to produce an electrical force in said circuit in response to and indicative of the magnitude and direction of transfer means rotation such to cause a compensating change in operating speed of the machine.

13. In combination with a wire advancing machine having an electric drive motor, an electrical control circuit connected to said motor including variable resistance means operable to cause the motor speed to vary, a shaft having a driving connection with said variable resistance means, a large sheave mounted for rotation on said shaft, a wire supply from which the wire is led to and wrapped about the sheave and then proceeds to the advancing machine, transfer means for guiding the wire on the sheave secured to said shaft, and means resiliently applying a predetermined torque to the shaft for biasing said transfer means in a direction to tension the wire, whereby any decrease and increase in tension will cause said transfer means to rotate relative to said sheave respectively in directions to wind and unwind the wire, the resulting shaft rotation driving said variable resistance means to produce a compensating change in the speed of the electric motor.

14. The method of maintaining substantially uniform tension in wire advanced between driven supply and take-up devices, which comprises the steps of establishing first and second reversely wound coils of the wire in its course of travel from the supply to the take-up device, applying a predetermined fixed tension to the wire, shifting circumferentially and correspondingly the point of exit of the wire from one coil and the point of delivery to the other coil simultaneously in response to increase and decrease in the wire tension, thereby to alter the accumulation of wire in both coils upon the occurrence of such deviations, the accumulation being increased when a decrease in tension below such predetermined fixed value occurs and decreased in response to excessive tension, and regulating the speed of the wire advance further in response to such changes in tension so as to compensate therefor.

References Cited in the file of this patent

UNITED STATES PATENTS

| | | |
|---|---|---|
| 1,475,855 | Murdock | Nov. 27, 1923 |
| 2,006,819 | Zschach | July 2, 1935 |
| 2,594,427 | Haase | Apr. 29, 1952 |

FOREIGN PATENTS

| | | |
|---|---|---|
| 210,701 | Germany | June 5, 1909 |